Dec. 14, 1954  ANIBAL ECHEZARRETA MULKAY  2,696,890
HAND CONTROL OF PEDALS INTO MOTOR DRIVE VEHICLES
Filed March 27, 1950  2 Sheets-Sheet 1
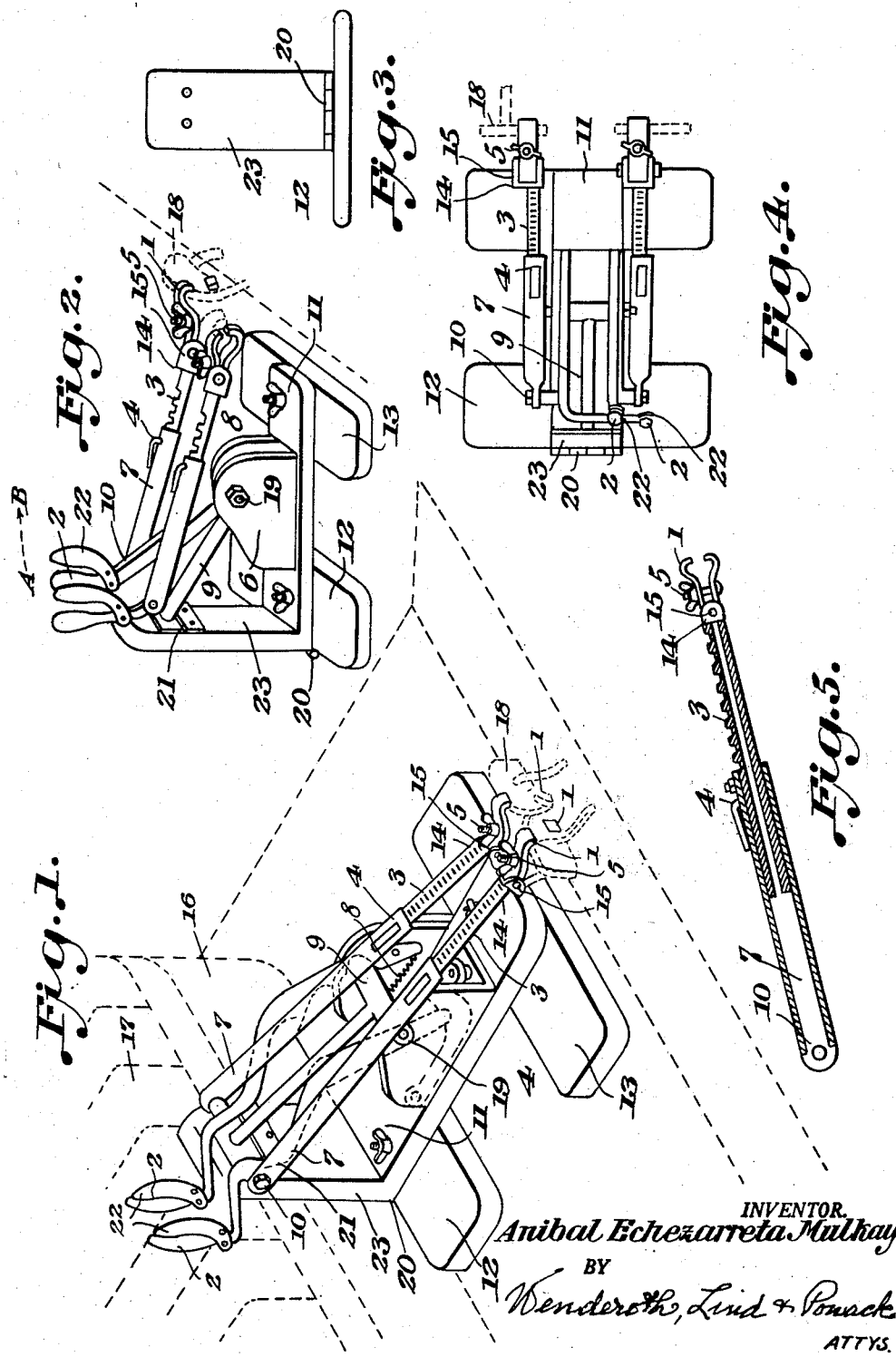
INVENTOR.
*Anibal Echezarreta Mulkay,*
BY
*Wenderoth, Lind & Ponack*
ATTYS.

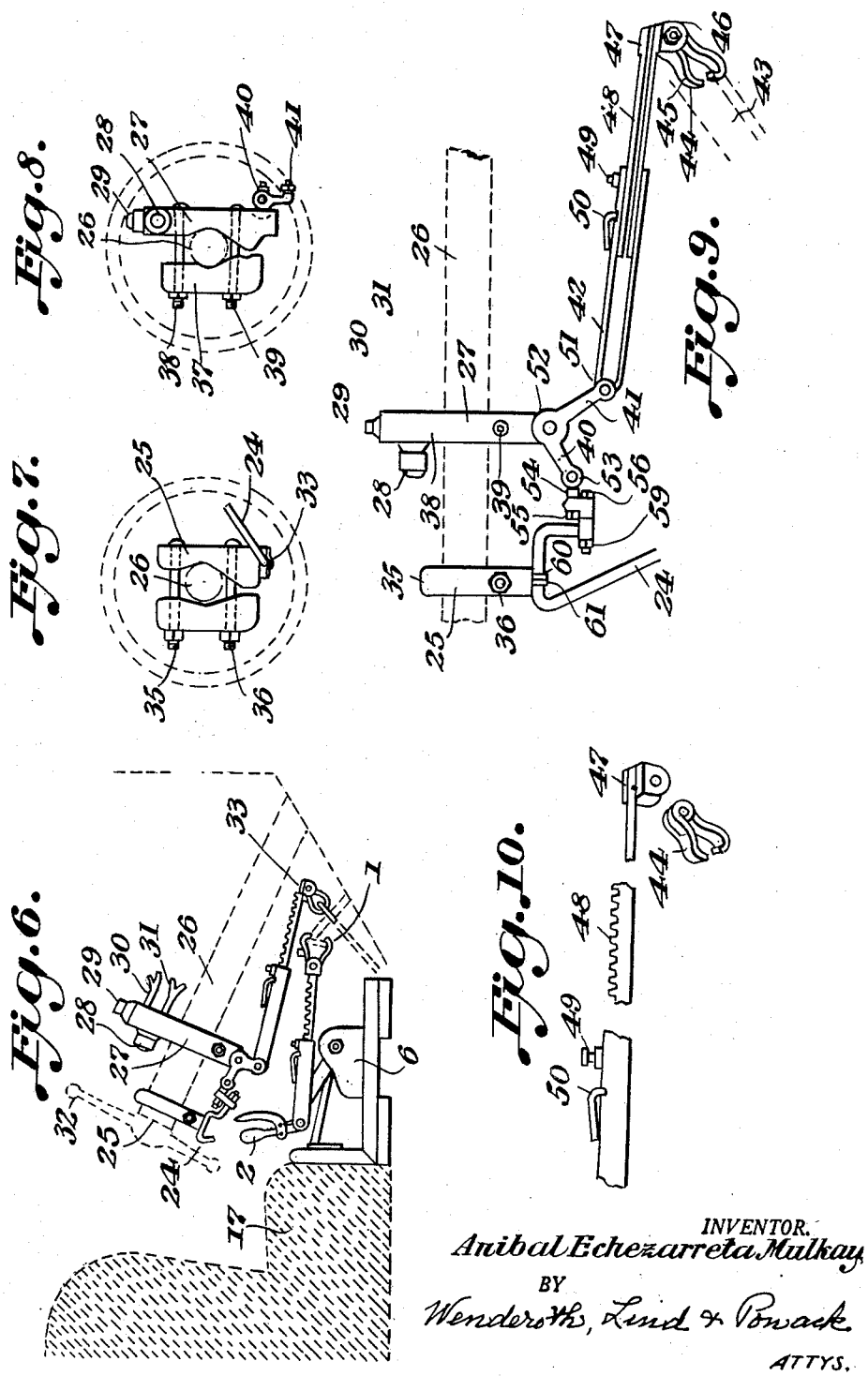

United States Patent Office 2,696,890
Patented Dec. 14, 1954

2,696,890

HAND CONTROL OF PEDALS IN MOTOR DRIVE VEHICLES

Anibal Echezarreta Mulkay, Luyano, Havana, Cuba

Application March 27, 1950, Serial No. 152,080

Claims priority, application Cuba May 11, 1949

3 Claims. (Cl. 180—78)

The invention makes reference to the driving controls of motor vehicles and has for its principal objective the provision of one such that will serve the purpose indicated and at the same time provide action by hand substituting for foot action, without impairing the use and action of the latter at will.

Outstanding among the many advantages of my invention, is the one enabling one to drive the vehicle by using just one or both hands without modifying or altering its foot pedals. It also has the advantage of being attachable in a few minutes on any motor driven vehicle, automobile, truck, omnibus, tractor, etc., said control being capable of distinct action in any type of automotive vehicle. Still another advantage is its being portable thereby assisting incapacitated persons with disabled legs to drive automobiles.

The invention will be hereinbelow described with advantages and objectives, as illustrated in the enclosed drawings in which the similar symbols of reference identify identical parts in the same, to wit:

Fig. 1, page 1 of drawings, shows a perspective view of one of the bodies or assembly of parts which is herein referred to as number 1 to distinguish it from number 2 which is described hereinafter. Fig. 1, in addition, shows in said view the part operating the pedals, brake and clutch in said control.

Fig. 2 is a lateral perspective view of the assembly shown in Fig. 1,

Fig. 3 is a rear view of the assembly identified by number 1 in Figs. 1 and 2.

Fig. 4 is a plan view of the assembly herein called number 1, being also shown in Figs. 1, 2, and 3.

Fig. 5 is a longitudinal sectional cut view of the arm operating the pedal.

Fig. 6 in page 2 of drawings is a lateral view of the entire control as installed in an automobile, it being possible to see in this Fig. 6 both bodies or assemblies of parts, i. e. the one shown as No. 1 herein referred to in Figs. 1, 2, 3, and 4 which rests on the front floor of the vehicle, operating the brake and clutch, and the one pointed as No. 2, herein shown in Fig. 6, resting on the steering bar to operate the accelerator pedal, the vehicle's starting controls and the light switches.

Fig. 7 shows a support of the accelerator control.

Fig. 8 shows an accelerator control support which in turn controls the motor starter and light switches.

Fig. 9 is a lateral view showing a sectional cut of part of the assembly herein described as No. 2, which operates the accelerator, the motor starter and the light switches.

Fig. 10 shows the four parts making up the arm operating the accelerator's pedal.

With reference to the drawings we see that the control invented by me consists of a jaw, 1 which engages pedal, 18 indicated by dotted lines in the drawings, and lever 2 which by hand operates the brake or clutch pedal, this part of the control consisting of a metal base, 6 which in turn supports the wooden—or other material—parts 11, 12, 13 and 23 by means of part 9, made of pipe. Base 6 is made up by a plate in U shape with lever 2 held by screw 19 being attached on its right and left sides. Lever 2 has handle 22 which, by means of a half moon dented claw 8, operates to fix the lever in different positions. By means of screw 10 lever 2 operates arm 7 made up of two pipes or tubes which slide into each other to fix the length of said arm by means of teeth 3 and claw 4. Arm 7 is connected to joint 15 which in turn is connected to jaw 1 which engages pedal 18 by means of screw 5 or pressure from a spring.

The base parts 12 and 13 resting on the floor of the vehicle, with the entire assembly leaning by means of part 23 against the lower front wall of the driver's seat 17 shown in Fig. 1 by dotted line, forms a solid base quadrant by means of parts 11, 23, hinge 21, and tubular prop 9 which connected by screw 19 fixes principal base 6.

When rod 14 slides inside part 3, which serves it as a tubular guide, since rod 14 is connected to, and forms part of, joint 15 which in turn engages pedal 18 together with jaw 1, my invention presents the great advantage of being able to operate the pedal directly by the foot of a person not incapacitated to do so with his feet, even though the control invented by me may be installed on the vehicle, making it possible for the automobile to be operated either by hand or feet at will.

It must be understood that the description referred to for lever 2 is the same as the other indicated by the same number.

As may be seen, Fig. 5 shows a longitudinal sectional cut view of arm 7 which is made up of two pieces of pipe, the main one attached at 10 by means of a bolt to lever 2 as shown in Figs. 1, 2 and 4, and the other tube shown in 3 with dented points. This arm or bar has the advantage of extending or becoming shorter in order to adapt it to the point where the pedal of any vehicle may be located. When tube 3 slides inside tube 7 the length of the arm is fixed by claw 4, soldered to tube 7, and the teeth of tube 3, or by means of a pin or button with a spring attached to tube 3, which goes through tube 7 through either of its longitudinal holes, to fix the arm's length. Introduced at the terminal of tube 3, in this arm 7, is rod 14 attached to joint 15 which in turn holds jaw 1, by means of screw 5, to engage the pedal.

Having described assembly or body number 1 which controls brake and clutch, we will now go on to describe assembly or body number 2 which controls the accelerator, starter and light switches.

Handle 24 mounted on support 25 as shown in Figs. 6, 7, and 9, operates the accelerator pedal movement by hand. Support 25, with its mate 34, adapt themselves to the wheel's 32 steering column 26, of any diameter in the majority of all vehicles on the market. Support 25 and its mate 34 are fastened to the starting wheel's column 26 by means of only screw 36, or by using screw 35 both shown on Fig. 7.

Support 27 and its mate 37, shown in Fig. 8, are attached to the steering wheel column 26 in the same manner as the one shown in Fig. 7, except that, instead of supporting handle 24, support 27 serves as bracket for the square shaped joint 40, 41, which transmits and converts the revolving movement of handle 24, into a movement directed against the accelerator pedal. On support 27 is mounted button 29 which operates the motor starter by connecting electric cable 30 shown in Figs. 6 and 9. This starter button is for hand operations, is supplementary to the one originally installed in the vehicle, does not interfere in the least with the latter, and is connected at the cables or circuit with which the vehicle is originally equipped; and button 28, also mounted on support 27 with its connecting cable 31 to contact the switch circuit for bright or dim lights, is also operated by hand without interfering with the foot switch which is standard equipment in any automobile where the controls invented by me may be installed.

Handle 24, shown in Fig. 9, attached to support 25 by journal bearing 60 with two screws 61, transmits the movement from top to bottom, connected at its terminal 58 with part 57, both held by a screw 56, and lock nut 59. Part 57 is connected to arm 40 of the square shaped joint which converts the vertical movement into horizontal movement by means of part 54, held fast by lock nuts 55 and 53. Square shaped joint 40, 41, rotates on support 27, fastened by screw 52. Arm 41 of the square shaped joint holds tubular arm 42, by means of screw 51, in turn giving motion to the accelerator pedal 43 shown by dotted lines since it is not part of the control invented by me, but part of the vehicle where it can be installed.

In Fig. 10 are shown the claw 50, set screw 49, teeth 48, joint 47 with its guide rod, and jaw 44, also shown in Fig. 9. The jaw is to engage the accelerator pedal. The other parts make possible the operation of extending or shortening arm 42 which, by means of jaw 44, engages the accelerator pedal 43, for the latter to be operated by hand through handle 24.

Method of operation

Assuming that the complete control invented by me is installed in an automobile, as shown in Fig. 6, the procedure to follow will be:

(a) Button 29 is pressed by hand to start the motor.

(b) After pressing handle 22, lever 2 is pushed forward on the left side, by hand, as shown in Figs. 1 and 2, to disengage the clutch. The gear shift lever is next operated to engage low gear.

(c) Handle 24 is pushed downwards, by hand, to engage the accelerator pedal and accelerate the motor.

(d) With the hand, hold said lever 2 and pressing handle 22, the lever is gradually brought backwards to engage the clutch and give the car a forward motion in low gear.

(e) The operation of handle 24 is repeated as in (c) to speed up the car in low gear.

(f) Handle 24 is pushed upwards to operate and idle the accelerator.

(g) Simultaneous with action (f) operation (b) is repeated and successively so to shift gears, repeating the operations in the order outlined for a reverse motion.

(h) Should the automobile be equipped with an automatic gear shift, operations (b) and (d) are omitted, operating the control only as in (c) and (f).

(i) Lever 2 is pushed forward on the left side as in (b), to disengage the clutch, at the same time pushing forward lever 2 on the right side to operate the brake and stop the car.

(j) Lever 2 on the right side is pushed forward to operate only the brake, at will.

(k) Button 28 is pressed by hand to operate light switches.

It is obvious that the attached drawings are merely illustrative and not restrictive, for which reason some modifications may be introduced without thereby implying any deviation from the spirit of my invention, or waiving any rights as to its field or scope as described in the following.

I claim:

1. In portable detachable remote control devices for the manual operation of the conventional clutch operated motor vehicle equipped with gear shift, clutch pedal, brake pedal, steering column, accelerator pedal, motor starter and light switches comprising a control panel selectively attachable to said steering column, an adjustable base adapted for being loosely placed on the floorboard of the vehicle, a hinged frame member on said base, a plurality of manually operated levers for the control of each of the conventional automotive, clutch, accelerator and brake means, a claw means and a handle means at the upper end of each said lever whereby manual operation is obtained, a jaw means at the lower end of each said lever engageable with the conventional automotive pedals and means coacting with said claw means to fix the levers in different positions, whereby a remote control device suitable for use by disabled drivers is obtained.

2. A remote control device as in claim 1, in which the handle means at the end of the levers are attached to said frame member by means of a journal bearing and are thereby rotatably disposed so as to adjust downward pressure on the accelerator pedal.

3. A remote control device as in claim 1 in which a starter button and light switch are provided on the control panel and is electrically connected to the conventional automotive electrical system.

References Cited in the file of this patent

UNITED STATES PATENTS

| Number | Name | Date |
|---|---|---|
| 1,275,706 | Langolf | Aug. 13, 1918 |
| 1,463,853 | Stocking | Aug. 7, 1923 |
| 1,812,352 | McCurdy | June 30, 1931 |
| 1,833,458 | Guiffre | Nov. 24, 1931 |
| 1,906,366 | Burns | May 2, 1933 |
| 2,234,082 | Pace | Mar. 4, 1941 |
| 2,489,727 | Shipley | Nov. 29, 1949 |
| 2,504,729 | Rajan | Apr. 18, 1950 |
| 2,548,240 | Reeder | Apr. 10, 1951 |